United States Patent Office 3,347,936
Patented Oct. 17, 1967

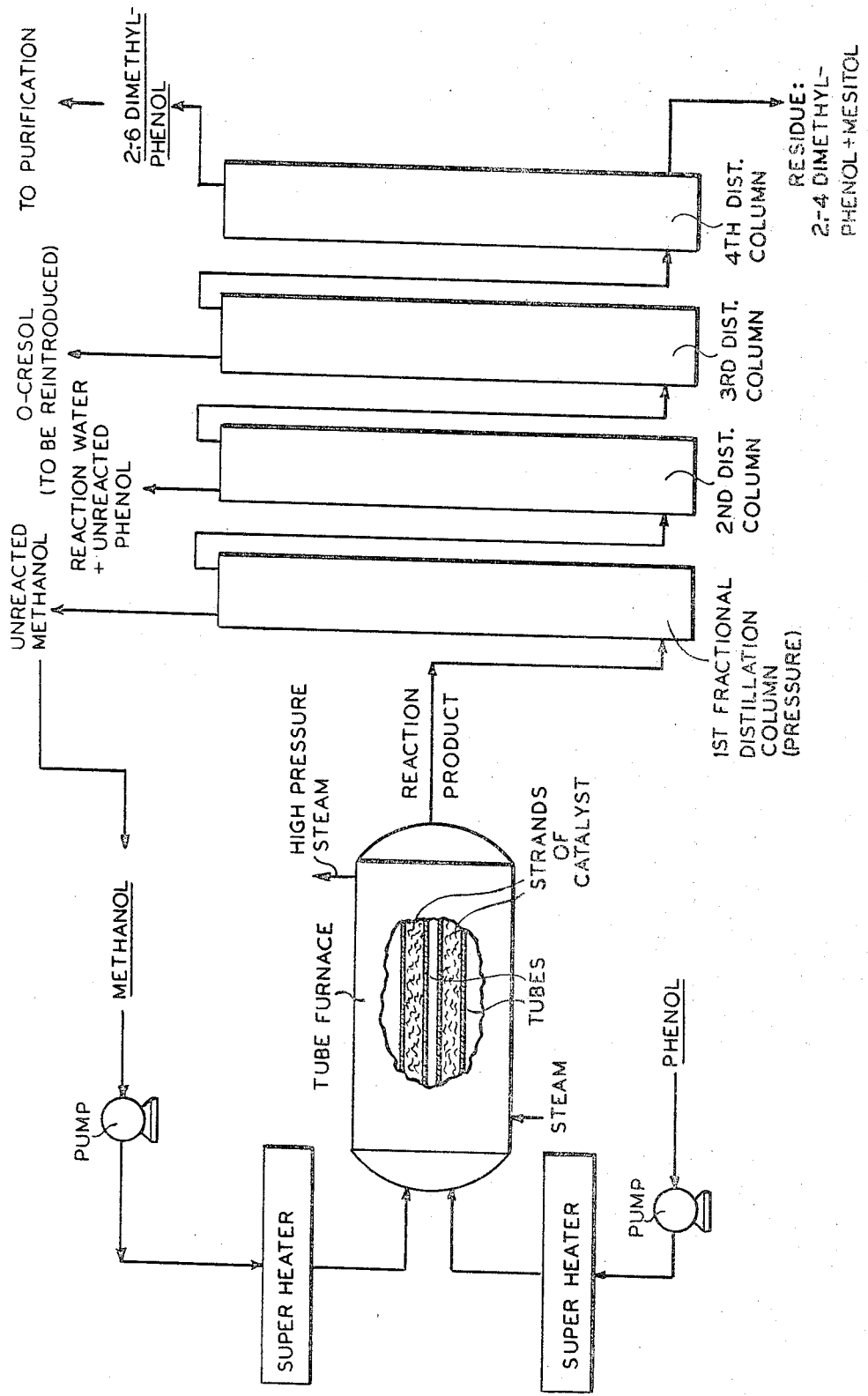

3,347,936
PROCESS FOR THE CONDENSATION OF PHENOL WITH METHANOL
Max Froitzheim, Castrop-Rauxel, Karl Friedrich Lang, Ruppertshain, Taunus, Ludwig Rappen, Duisburg-Meiderich, and Johannes Turowski, Castrop-Rauxel, Germany, assignors to Rutgerswerke und Teerverwertung Aktiengesellschaft, Frankfurt am Main, Germany
Filed Nov. 8, 1965, Ser. No. 506,714
Claims priority, application Germany, Sept. 23, 1965, R 41,592
3 Claims. (Cl. 260—621)

This invention relates to the condensation of phenol ($C_6H_5OH$) with methanol and has particular relation to such condensation in the presence of a catalyst containing magnesium oxide and uranium oxide and, if desired, boron oxide, with the formation of 2,6-dimethylphenol and, as by-product, o-cresol.

Preparation of 2,6-dimethylphenol has been recently the subject of various research studies, because this compound is a demanded starting material for the preparation of synthetic plastic materials, particularly polyethers, such as polyphenylene oxide. The o-cresol which is obtained as by-product in varying amounts depending on the conditions of the process according to the present invention is being used in increasing amounts as pesticide.

It has been known from the British Patent No. 717,588 to prepare 2,6-dimethylphenol by condensing o-cresol and methanol in the vapor phase in the presence of a dehydration catalyst which consists of a metal oxide. In this known process reaction temperatures in the range of 300 and 450° C., preferably 350 and 400° C., are used. As suitable metal oxides, oxides of aluminum, thorium, zirconium, zinc, manganese, magnesium, calcium and barium are described in said British patent. The yields are in the range between 44 and 76% calculated on the amount of converted cresol. As by products m- and p-cresol are formed in small amounts.

Condensation of phenol with methanol is also mentioned in certain prior art papers. According to Berichte, vol. 60B, 1927, pp. 130–3, in the reaction of methanol with phenol, in the presence of $Al(OH)_3$ at 440° C. and under a pressure of 220 atmospheres, o-cresol is obtained in yields of 6–7% based on the amount of phenol introduced into the reaction, in addition to anisole and xanthene. An attempt to condense phenol with methanol in the presence of aluminum chloride had no success, because the anisole former was saponified to phenol. (See Chemisches Zentralblatt, 1937, II, 1363.)

According to the Journal of American Chemical Society, 1945, 821–3 (see also Chemical Abstracts 40, 1946, pp. 1153–4), in the presence of activated aluminum oxide at 345° C. a mixture of o-, m- and p-cresol and higher methylated phenols, mainly xylenols, and additionally hexamethylbenzene, anisole, methylanisoles and gaseous products are formed.

According to a report in the Russian language (published in Zhurnal Obshei Khimii 27 (89), 2697–9, 1957) by catalytic alkylation of phenol with $CH_3OH$ on natural activated aluminum silicate at 320–500° C. an alkylphenol-fraction of 68% (based on the amount of converted phenol) is formed, said fraction consisting of o- and m-cresol and 3,5-dimethylphenol. In addition, neutral reaction products, such as anisole, o-methylanisole, and hexamethylbenzene are also formed. It is stated l.c. that the catalyst used completely loses its activity after 18 hours of use and must be replaced by fresh catalyst.

It is the main object of the present invention to catalytically steer condensation of phenol with methanol in such manner that as the preferred products 2,6-dimethylphenol and o-cresol are formed, without the formation of m- and p-cresol. Another principal object of the invention is the improvement of the catalytic o-methylation of phenol by means of catalysts which are distinguished by long-lasting catalytic activity, are robust and relatively inexpensive, cause only slight decomposition of the unreacted methanol and—in order to attain high final yields of the desired products—show no formation of residues.

These objects are attained by mixing the starting materials phenol and methanol at temperatures between 400 and 500° C. in the presence of a catalyst which contains magnesium oxide, uranium oxide and, if desired, boron oxide. The catalyst may contain a high proportion of magnesium oxide and a lower proportion of uranium oxide, or a high proportion of uranium oxide and a lower proportion of magnesium oxide. Catalysts which contain—in addition to the beforementioned components—in minor proportions also other metal oxides are also effective.

In the following examples 1 mol of phenol was condensed with 4 mols of methanol at the temperatures stated, by passing the reaction mixture through a reaction tube. Examination of the reaction products was carried out by chromatographic processing. Formation of residues was examined by fractional distillation.

Preparation of the catalysts used in carrying out the process claimed, does not form part of the present invention.

*Example I*

The process according to the present invention can be carried out on a commercial scale as follows.

A tube reactor, the tubes of which have a diameter of 80 mm., are filled with strands of 3 mm. diameter of a catalyst of $UO_3$—$MgO$—$B_2O_3$. In order to prepare a catalyst consisting of 70% $MgO$, 17% $B_2O_3$ and 13% $UO_3$, 600 g. of solid boric acid are suspended in 6 liters of water and into the resulting suspension 2400 g. of MgO are stirred in and thoroughly mixed with the suspension. In order to attain this, the addition of further 3 liters of water is necessary. The uniform mixture thus obtained is formed to strands, dried at 120° C. and is calcined in the tube furnace, while passing air through the furnace, at 600° C. After discharge from the furnace, the material is ground, mashed with a solution of 683 g. of uranyl-nitratehexahydrate dissolved in 2 liters of water, shaped and dried at 120° C. Decomposition of the nitrate is brought about in a tube furnace by heating with passing air through said furnace and finally the material is subjected to calcination at 650° C. After discharge and cooling, the material is comminuted and shaped to 3 mm. moldings. 3 liters of the catalyst are thus obtained. The tubes of the furnace are filled with the molded catalyst and by means of a pump and a vaporizer into the furnace 1 mol-equivalent of phenol is introduced, after being heated in a superheater to 440° C. In the same manner 4 mol-equivalent of methanol are vaporized and superheated and mixed with the stream of phenol prior to entering the reactor. The reaction of phenol with methanol yields 2,6-dimethylphenol and water and is exothermic. The reaction heat is utilized for the production of steam of 20 atmospheres. The reaction takes place at 450° C. The load on the catalyst is 1.2. No waste gas is formed and the loss of methanol amounts to 8%, based on the weight of the charge introduced into the reaction. The reaction product thus formed is processed by distillation. In a first distillation column, in which distillation is preferably carried out under pressure, the unreacted methanol is recovered and is reintroduced into the process. In a second distillation column the reaction water is separated, which contains the phenol still present. In a third distillation column o-cresol is continuously obtained and can be reintroduced, if desired, into the process. In a fourth column, at the head of the column, a technically pure 2,6-dimethylphenol (of 96%) is obtained in addition to a residue consisting of 2,4-dimethylphenol and mesitol. 3-methylphenol and 4-methylphenol are absent in the reaction product. Further purification of the 2,6-dimethylphenol takes place by redistillation in a manner known by itself. The 2,6-dimethylphenol thus prepared has a solidification point of 45° C. and a concentration of at least 99.8%.

If the catalyst used in the tube furnace shows reduction of its activity, the proportion of methanol is increased for a short period of time, whereupon the original activity of the catalyst will be obtained again.

Processing of the water resulting from the reaction described above takes place according to conventional procedures and the phenol recovered is reintroduced into the process. The amounts of individual compounds present in the reaction product in this example were as follows: phenol: 2%; phenolether: 2%; o-cresol: 27%; 2,6-dimethylphenol: 62%; 2,4-dimethylphenol: 1%; mesitol: 6%.

If it is desired to modify the reaction in the direction of o-cresol formation, a phenol-methanol mixture of 1:2 mol-equivalents is used. The reaction temperature should be about 20° C. lower and the load of the catalyst increased to about 1½.

*Example II*

In order to prepare a catalyst consisting of 88% of MgO and 12% of $UO_3$, 20160 g. of magnesiumnitrate hexahydrate and 760 g. of uranylnitrate hexahydrate are dissolved in 12 liters of water. In order to precipitate this solution, to the warm solution 8 liters of concentrated ammonium solution are added and the mixture is saturated with gaseous $H_3N$ with vigorous stirring of the mixture. The precipitate is separated by filtering with suction and washed wtih 5 liters of concentrated ammonia solution in order to remove the bulk of ammonium nitrate. The filter-cake is shaped to strands and dried at 120° C. The dried strands are freed from residual nitrate in a tube furnace, through which air is passed, and calcined at 650° C. After discharge from the furnace and grinding, strands having the necessary stability can be formed. 3 liters of catalyst are thus obtained.

The process is carried out in a manner similar to that described in the above Example I. The reaction temperature is 450° C.; the load on the catalyst 1.0; 230 liters of waste gas are formed per hour and liter of the charged reactants; the loss of methanol is 8%, based on the weight of reaction mixture charged into the tube furnace. The reaction product contains 7% of phenol, 1% of phenolether, 34% of o-cresol, 49% of 2,6-dimethylphenol, 1% of 2,4-dimethylphenol and 8% of mesitol. The amount of 2,6-dimethylphenol after 100 hours was 49% and the catalyzed product contained 12% of $H_2O$.

*Example III*

Condensation between phenol and methanol was carried out in this example in the presence of a catalyst consisting of 78% of MgO and 22% of $UO_3$.

In order to prepare such catalyst, 3120 g. of MgO are formed to a paste with 12 liters of methanol and the resulting product is mixed with a solution of 1544 g. of uranylnitrate hexahydrate in 5.4 liters of methanol. The resulting slurry is formed to strands and dried at 120° C. In a tube furnace at increased temperature and by conducting air over the product the nitrogen oxides are driven out and the residue is calcined at 650° C. After removal from the furnace the catalyst is ground. By pressing, about 3 liters of catalyst in strand shape can be obtained.

Condensation is carried out in a manner similar to that described in the above Examples I and II. The temperature of condensation was 450° C., and the load on the catalyst 1.0. 200 liters of waste gas were obtained per hour per liter of introduced reactants. The loss of methanol was 9% based on the weight of reactants charged. The reaction product contained 5% of phenol, 1% of phenolether, 25% of o-cresol, 60% of 2,6-dimethylphenol, 2% of 2,4-dimethylphenol and 7% mesitol. The catalyzed product contained 13% of $H_2O$ and after 100 hours 58% of 2,6-dimethylphenol were obtained.

*Example IV*

A catalyst consisting of 50% of MgO and 50% of $UO_3$ was prepared by suspending 2000 g. of very fine MgO in 4 liters of water and uniformly mixing the resulting suspension with a solution of 3512 g. of uranylnitrate hexahydrate dissolved in 5.2 liters of water. The slurry thus obtained is formed to strands and dried at 100–150° C. The dried catalyst is introduced into a tube furnace and through the furnace air is passed in an amount of 100 liters per hour per liter of dried material. In this manner the nitrates are converted into oxides by slowly increasing the temperature and calcining at a terminal temperature of 650° C. After growing cold, the discharged material is ground and the resulting powder is shaped in a press under 300 atmospheres of pressure. About 3 liters of a yellow catalyst are thus obtained.

Condensation of phenol with methanol was carried out in the presence of the above described catalyst in a manner similar to that described in the above Example I. The condensation temperature was 400° C.; the load on the catalyst was 1.0; no waste gas was formed and no losses of methanol were observed. The recreation product contained 1% of phenol, 1% of phenol-ether, 18% of o-cresol, 66% of 2,6-dimethylphenol, 2% of 2,4-dimethylphenol and 12% of mesitol. The product of catalysis contained no water.

*Example V*

In order to prepare a catalyst consisting of 94% of MgO and 6% of $UO_3$, 3760 g. of magnesium oxide are mixed with 6 liters of water and to the paste thus obtained 421.6 g. of uranylnitrate hexahydrate dissolved in 2 liters of water are added. After homogeneously mixing these components, the mixture is shaped to strands which are dried at 120° C. Decomposition of the nitrate to the oxide and the subsequent calcination at 650° C. is carried out in a suitable tube furnace. After cooling, the catalyst is comminuted and brought into the desired shape by pressing. In this manner 3 liters of strands of 3 mm. diameter and 5 mm. length are obtained. Condensation was carried out at 450° C. and the load on the catalyst was 1.0. No waste gas was formed and there was no loss of methanol. The reaction product contained 24% of phenol, 1% of phenol-ether, 34% of o-cresol, 23% of 2,6-dimethylphenol, 9% of 2,4-dimethylphenol and 9% mesitol.

It has been found that a catalyst system which will operate with an optimum effect in the preparation of 2,6-dimethylphenol from phenol and methanol under the conditions of the present invention a proportion of 10–30% of uranium oxide is necessary for securing high yields and simultaneously a long life period of the catalyst. In other words, the presence of uranium oxide in the catalyst system is indispensable for satisfactory operation of the catalytic condensation. From the data of the above Examples it can be clearly seen that the catalysts containing uranium oxide according to the present invention have a long life period. The analysis of the gas formed shows that the waste gas contains 5–10% $CO_2$. This proves that the catalyst is protected from being coated with carbon during the condensation reaction. A further advantage of the catalysts consisting essentially of uranium oxide and magnesium oxide is the reaction temperature which has been found to be relatively low. This is shown particularly clearly if the catalyst consists of 50% magnesium oxide and 50% uranium oxide. In this case the process can be carried out with good yields at 400° C.

It has been further found that an additional advantage of the magnesium oxide-uranium oxide catalysts consists in that in using these catalysts only small amounts of ether and 2,4-dimethylphenol are formed and m-substituted phenol derivatives are completely absent in the phenol-methanol condensation process according to the invention.

A further advantage of this process is the possibility of processing the reaction product in a simple manner. As the condensation product contains only small amounts of anisole and methylcresolether (1%) and m-cresol and p-cresol in a maximum amount of 0.1–0.2%, the recovery of 2,6-dimethylphenol and o-cresol can be carried out by distillation solely.

The term "load on the catalyst" is used herein to refer to the following formula:

$$\frac{\text{liters of the liquid reactants charged}}{\text{liters of the catalyst} \cdot \text{hours}}$$

The term "liters waste gas" denotes the waste gas obtained per hour and per liter of liquid reactants charged. The term "loss of methanol'" denotes percent based on the weight of the charge.

Condensation of phenol with methanol according to the invention is carried out at a temperature in the range between 400° and 500° C. The activity of the catalysts used according to the invention is not adversely affected by the presence of minor amounts of other metal oxides. It is preferred to carry out condensation at ordinary atmospheric pressure. The preferred ratio phenol:methanol is one mol-equivalent of phenol to 4 mol-eqivalents of methanol, but other ratios can also be used. Catalysts consisting of a major amount of $UO_3$ and a minor amount of MgO may consist e.g. of 99% of $UO_3$ and 1% of MgO.

In Example V, the distillation in the first column is preferably carried out under a pressure of 3 to 10 atmospheres.

In order to counteract decrease of the catalyst activity in the tube furnace, the phenol-methyl alcohol ratio is increased for a short period of time, e.g. 30 minutes, to 1 mol-equivalent phenol to 7 mol-equivalent methanol.

The parts and percent indicated herein are by weight if not otherwise stated. An apparatus for carrying out the process of the invention is diagrammatically illustrated in the appended drawing.

What is claimed is:

1. A process for the condensation of phenol ($C_6H_5OH$) with methanol with favored formation of 2,6-dimethylphenol and o-cresol, consisting essentially of heating a mixture of phenol and methanol at a temperature in the range between 400° and 500° C. in the presence of a catalyst composed essentially of oxides selected from the group consisting (a) of a mixture of $UO_3$ with MgO and (b) a mixture of $UO_3$, with MgO and $B_2O_3$.

2. A process as claimed in claim 1, in which the catalyst used consists of a mixture of 50–6% by weight of $UO_3$ and 50–94% by weight of MgO.

3. A process as claimed in claim 1, in which the catalyst used consists of 13% by weight of $UO_3$, 70% by weight of MgO and 17% by weight of $B_2O_3$.

References Cited

UNITED STATES PATENTS 2,448,942  9/1948  Winkler et al. _____ 260—621

FOREIGN PATENTS 717,588  10/1954  Great Britain.

LEON ZITVER, *Primary Examiner.*

H. ROBERTS, *Assistant Examiner.*